United States Patent
Tognazzini et al.

(10) Patent No.: US 6,480,204 B1
(45) Date of Patent: Nov. 12, 2002

(54) TRANSPARENT SUNPAD FOR HOME SHOPPING

(75) Inventors: Bruce Tognazzini, Woodside, CA (US); Jakob Nielsen, Atherton, CA (US); Bob Glass, Los Gatos, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/642,223

(22) Filed: Apr. 30, 1996

(51) Int. Cl.[7] .............................................. G06T 15/00
(52) U.S. Cl. ...................................................... 345/629
(58) Field of Search ................................ 345/419, 421, 345/427, 435, 629, 630, 634

(56) References Cited

U.S. PATENT DOCUMENTS

| | | | |
|---|---|---|---|
| 4,714,428 A | * 12/1987 | Bunker et al. | 345/118 |
| 5,086,354 A | 2/1992 | Bass et al. | 359/465 |
| 5,287,437 A | 2/1994 | Deering | 395/127 |
| 5,515,485 A | * 5/1996 | Luquet et al. | 345/435 |

FOREIGN PATENT DOCUMENTS

EP 0 607 000 A2 7/1994

OTHER PUBLICATIONS

Deborah Hix et al., "Pre-Screen Projection: From Concept to Testing of a New Interaction Technique", Human Factors in Computing Systems, CHI '95 Conference Proceedings, Denver, Colorado, May 7, 1995, pp. 226–233.
"LCD Lenses Provide Flicker-Free 3D", Machine Design, Cleveland, Ohio, Mar. 7, 1991, vol. 3, No. 5, p. 44.

* cited by examiner

Primary Examiner—Phu K. Nguyen
(74) Attorney, Agent, or Firm—McDermott, Will & Emery

(57) ABSTRACT

Rendered wireframe models of objects offered for sale can be downloaded and displayed as virtual objects in the context of the actual environment in which they will be actually used. The rendered models are located, scaled and oriented so that they appear exactly as a real object would appear when placed in the actual environment. A transparent display permits the environment to be viewed concurrently with display of the rendered wireframe model.

19 Claims, 9 Drawing Sheets

TRANSPARENT SUNPAD FOR HOME SHOPPING

BACKGROUND OF THE INVENTION

1. Field of the Invention

The invention relates to computing systems and more particularly to a hand held computer with a transparent display utilized to allow a viewer to see a rendered wireframe model of an object in the context of the surroundings where a real object might be placed.

2. Description of Related Art

Consumers often find that goods they have purchased, once placed in the target environment, prove to be unsatisfactory. For example, although the size and color of a particular object may be described in a traditional printed catalog or available from an on-line catalog over a network such as the Internet's World Wide Web, consumers may be disappointed after purchase, when the object is actually placed in the consumer's home or other target environment.

Computerized two-dimensional images of retail objects are known but provide the consumer with little sense of the object's size or with what degree of success the object would integrate into the destination environment. This is especially true of "custom" items where no corresponding physical sample exists.

Virtual reality systems allow the consumer, while wearing an uncomfortable helmet, to see a three-dimensional stereo representation of an object within an artificial environment, but suffers similar limitations.

A videotape entitled "Starfire" was produced by SunSoft in 1994. It depicted a portable hand held computing device called the SunPad. Using an flat-panel opaque screen, the SunPad displayed images captured by a separate (and remote) camera. The SunPad was used to remotely control the camera, i.e. the camera movements were controlled by the user and the SunPad's display was continually updated so that it became a remote display for the camera's output. The SunPad depicted in the videotape did not allow the consumer to change the context in which objects were viewed.

The Problems

The techniques described above all suffer the same limitation: the inability of the consumer to view a representation of an object within an environment, or context, where it would normally be used. This inability denies consumers significant relevant information which leads, in turn, to bad purchases (e.g. "The microwave oven sticks out over the edge of the counter!") and subsequent returns.

Being able to view the object in context enhances the buying experience for the consumer and reduces costs of returns and exchanges for the seller. The consumers ability to make better buying decisions when interacting with electronic marketing forums such as the World Wide Web will promote widespread acceptance of retail electronic commerce.

SUMMARY OF THE INVENTION

The present invention provides apparatus, systems, processes and computer program products which permits the user, after downloading a three-dimensional representation of an object, to place, move and rotate that representation of the object (virtual object) within the user's environment. This is accomplished using a hand-held computing device with transparent flat-panel display and with location sensors, providing the x, y, z, roll, pitch and yaw coordinates of the computing device with respect to a reference coordinate system. To obtain a full three-dimensional stereo view of the object, the three-dimensional representation may be viewed through shuttered glasses or through red-blue 3-D viewing glasses.

By placing a locating sender where the user wishes to place the virtual object, a sender on the shuttered glasses and a receiver in the hand held computing device, the necessary coordinate information is made available to standard imaging software to display left and right stereo images of the virtual object on the hand held computing device.

These stereo images, when viewed through shuttered glasses, present alternating via left/right views in a sequential manner so that the virtual object appears appropriately placed and focused within the user's environment, at the place specified by a sender.

After the user has successfully placed the virtual object within the environment, the hand held computing device can be moved in any direction within the coordinate system and the perspective and view of the virtual object will change appropriately. It is possible for the user to circle around the virtual object and view the object in the context of the actual environment from different angles through the display screen of the hand held computing device.

These novel features of the invention provide users with the ability to see the virtual object in the actual target environment at its real size and shape merely by looking through the transparent pad.

The invention is directed to apparatus for displaying a three dimensional representation of an object in the context of an environment in which the object might be placed. It includes, a computing device with a transparent display, a viewer for permitting a user to view images on the transparent display and through the transparent display and a device for measuring distance between the viewer and the computing device and between the viewer and a location in the environment; The computing device is configured to display an image of the object as if the object were positioned at the specified location in the environment. The device for measuring distance includes one or more telemetry senders and one or more telemetry receivers. A telemetry sender can be removably attached to the computing device. The apparatus includes the ability to fix the representation of the object so that as the user changes position, the representation stays fixed with respect to the room (environment) in which the apparatus is located. The orientation of the representation can be changed under user control. The view of the object is preferably in stereo.

The invention is also directed to a method for displaying a three dimensional representation of an object, by displaying and initial three dimensional representation of the object; determining a distance from a display of a computing device to a location at which the object should appear to be located; and adjusting the display of the object to appear to be positioned at that location. Preferably the object is displayed on a transparent display screen by which the context of an environment in which the object might be placed can be concurrently viewed. Three dimensional representations can be downloaded to a computing device from another computer over a network.

The invention is also directed to a system for displaying a three dimensional representation of an object in the context of an environment in which the object might be placed, including a source of one or more three dimensional representations of objects, a computing device for displaying a three dimensional representation of an object in the context of an environment in which the object might be placed, and a selectively actuatable link, such as a dial up network link, between the source and the computing device.

The invention is also directed to a method for accessing information about items available for acquisition, comprising the steps of: retrieving at least one three dimensional representation of one of the items and displaying the three dimensional representation on a transparent screen by which three dimensional representation can be viewed in context with an environment in which one of the items might be used. The invention is also directed to a system for accessing information about items available for acquisition, including a network, a first storage device containing at least one three dimensional representation of one of the items, connected to the network, a computing device connected to the network, configured to download and display three dimensional representations, a stereo viewer connected to the computing device; and a device for measuring distance between the stereo viewer and the computing device and between the stereo viewer and a location in the environment of the computing device, in which the computing device displays three dimensional representations at the location with a scale determined by the distance between the stereo viewer and the computing device and between the stereo viewer and the location in the environment.

The invention is also directed to a computer program product including a memory medium and a computer program stored on the memory medium containing instructions for displaying a three dimensional stereo representation of an object with sizing and orientation appropriate to a location in the environment of a computer upon which the program is to run.

BRIEF DESCRIPTION OF DRAWINGS

The objects, features and advantages of the system of the present invention will be apparent from the following description in which.

DESCRIPTION OF THE PREFERRED EMBODIMENT

Figure 1:
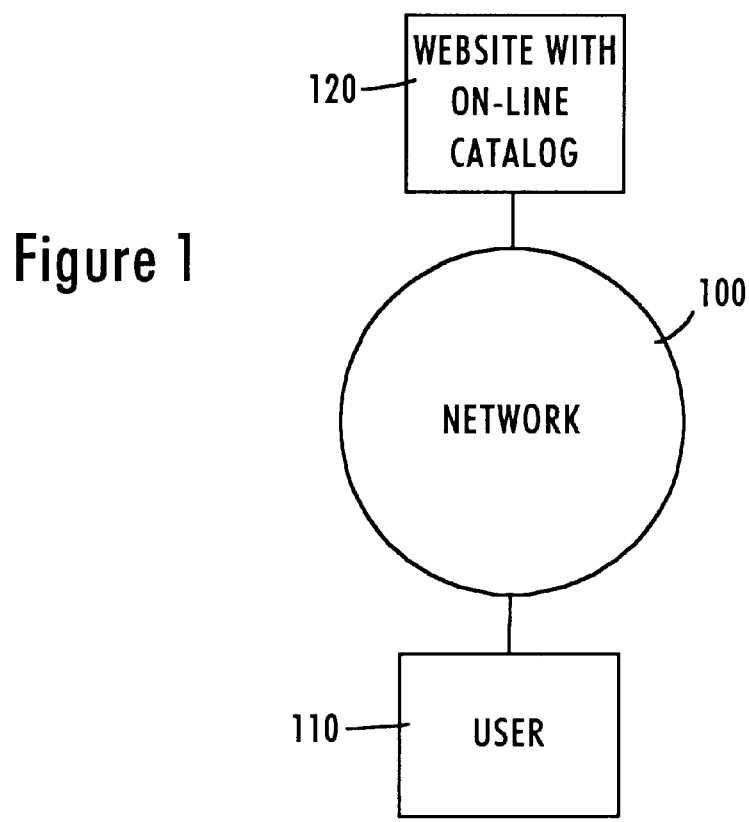
FIG. 1 is an illustration of a user connected over a network to a web site.
Figure 2:
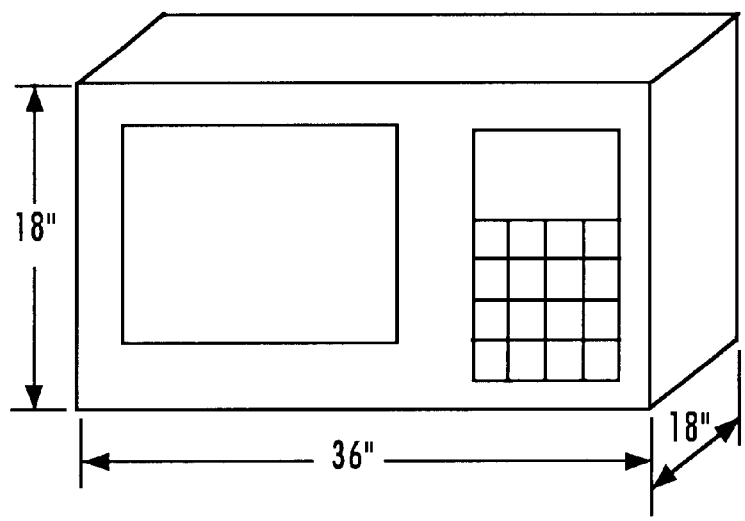
FIG. 2 is an illustration of a microwave oven.

The following scenario provides an overview of one use of the invention in conjunction with FIGS. 1 and 2 of the drawings.

A consumer (user 110) browses a network (100) such as the World Wide Web, searching for information about microwave ovens (e.g. FIG. 2). Having found a Web page on a web site 120 that contains information about various models of microwave ovens, the consumer can't decide, based on dimensional and aesthetic information, which model is preferred. So the consumer clicks a button on the Web page to download a three-dimensional surface rendered wireframe model to his hand held computing device. The device has a transparent display screen upon which the wireframe model is displayed. After adjusting position and orientation, the consumer holds up the transparent pad and looks through it to see a three-dimensional image of the microwave sitting in the location he has specified. Since the display screen is transparent, he also sees the area surrounding where the microwave will be located when it is installed.

The consumer may then move the image, change its orientation, and move around it to gain an appreciation for different perspective views of the microwave in its target environment. The consumer can then either order the microwave or look at other models as needed.

Figure 3:
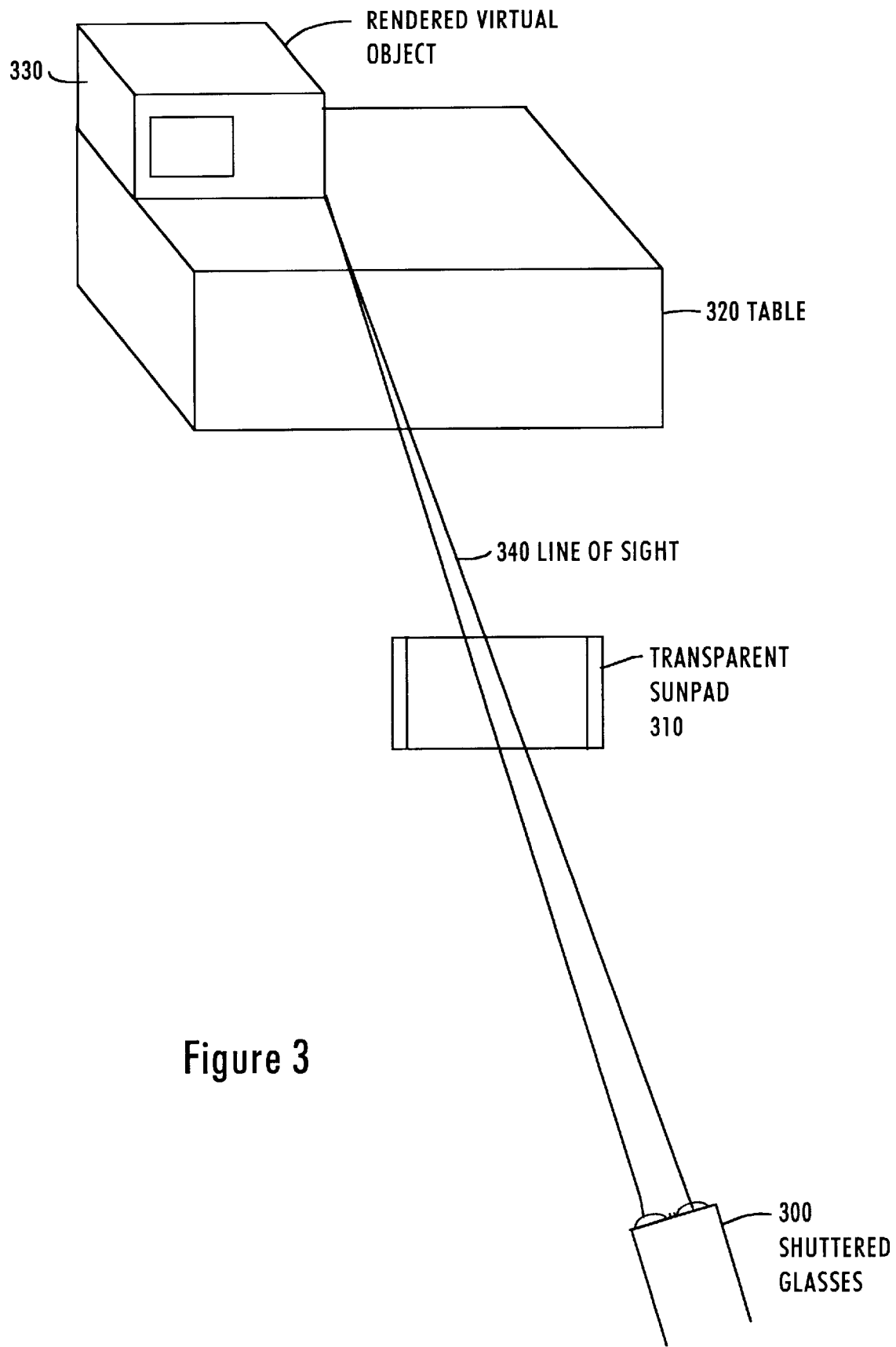
FIG. 3 illustrates a display of a virtual object displayed in the environment of its intended use in accordance with the invention.

This scenario is illustrated in FIG. 3. The user wears a pair of shuttered glasses (300) which, under control of the hand held computing device (310), sequentially displays left eye and right eye images of the three-dimensional virtual microwave oven (330), properly positioned on the table (320) which is the focal point indicated by the sight lines (340).

Figure 4:
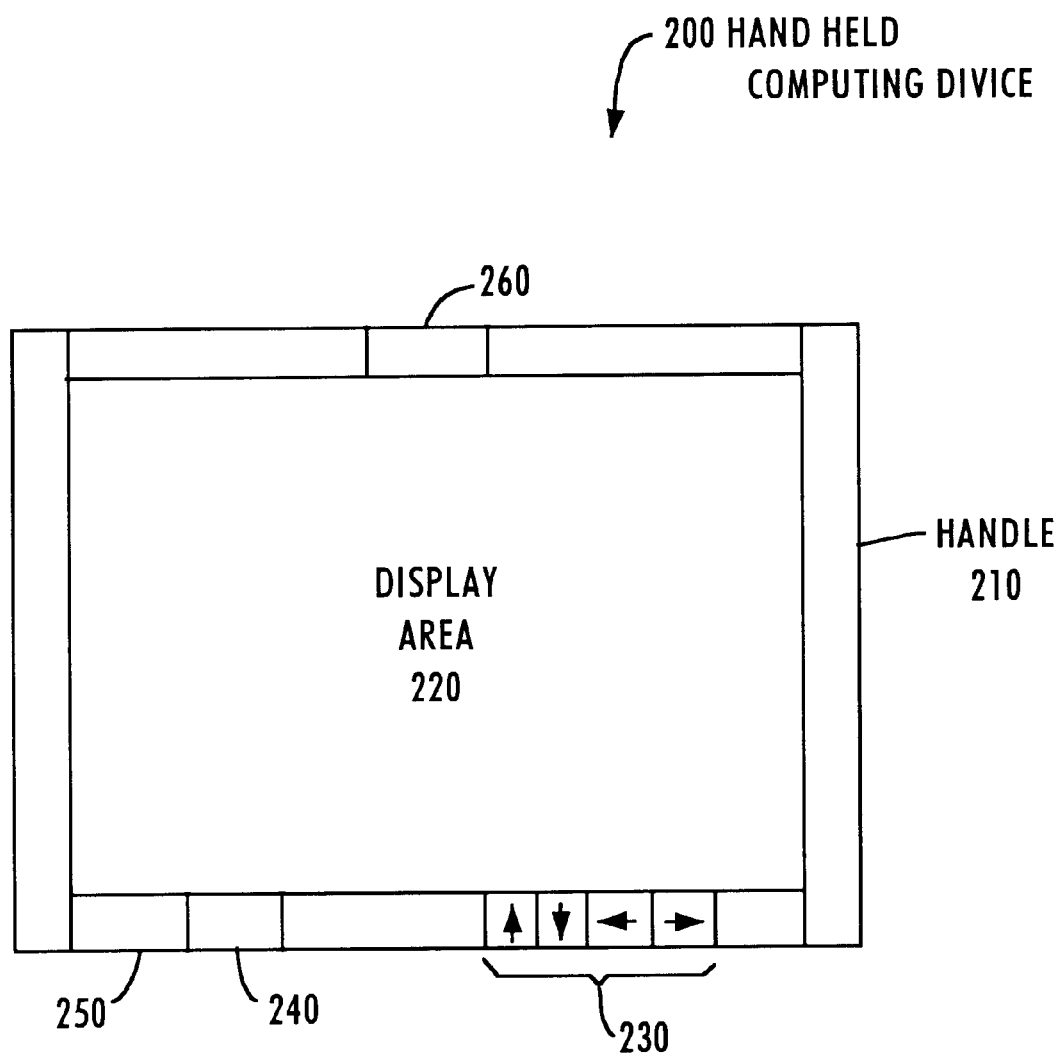
FIG. 4 illustrates a hand held computing device with a transparent display.

FIG. 4 illustrates the design of the transparent SunPad (400). The display area (420) is a flat panel composed of a transparent substrate with light emitting elements such as light-emitting diodes (LED) embedded therein in a display matrix. The degree of transparency is a function of the number of light emitting elements used and their opacity. Intensity control of the displayed image would permit the contrast between the displayed image and the background surroundings to be adjusted. As is standard in display technology, the light emitting elements may be grouped as triads of elements of different colors to permit display of color images.

The fixed telemetry receiver (260) and removable telemetry sender (250) determine the x, y, z, roll, pitch and yaw coordinates of the sender location vis-a-vis the computing device. An example of such device is the well-known Polhemus device. A similar sender is located in the shuttered glasses (100).

The receiver/transmitter device (240) is used to communicate with other computing devices. Download of three-dimensional information about the object to be displayed occurs over this link. It is downloaded in a standard graphics file format such as a computer graphics metafile (CGM) and loaded into the transparent SunPad. The user interface controls (230) allow the user to manipulate the image in a three-dimensional manner as discussed more hereinafter.

Figure 5:
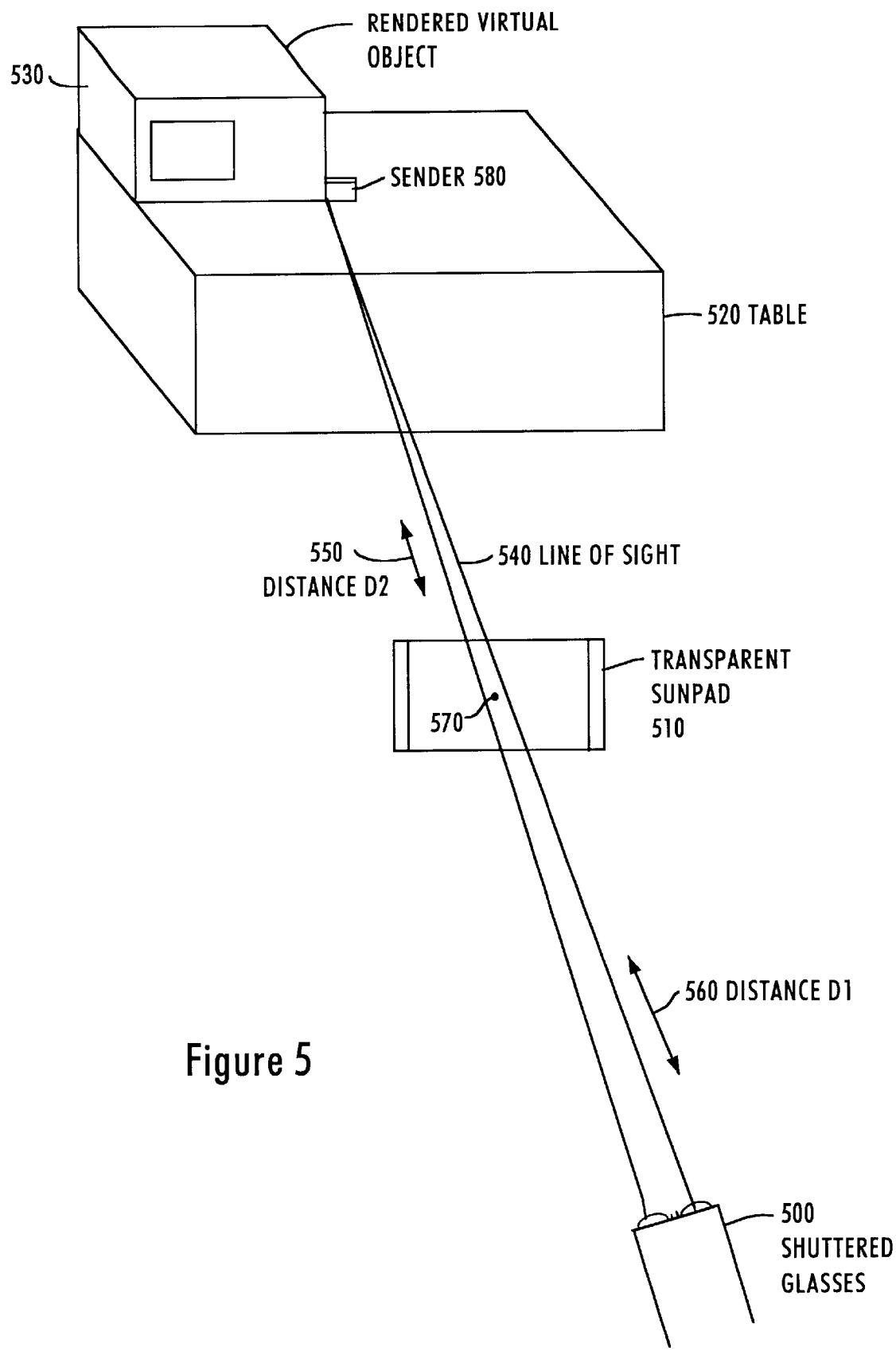
FIG. 5 illustrates operation of the invention.

FIG. 5 illustrates conceptually how the various components of the system work together. Assume that the graphics file has been downloaded to the transparent pad. The user then places a telemetry device (380) where the virtual object is to be positioned. By looking through the transparent pad to the focal point at 380 the user will see the virtual object in three-dimensions.

To place the virtual object at the designated position, several computations must be made. First, the scale of the virtual object must be determined. Conceptually, the scaling factor is the ratio of the distance $d_1$ (560) between the shuttered glasses (500, 590) and the transparent SunPad (510), to the sum of distance $d_2$ (550) (between the transparent pad (510) and the desired position (580)), and $d_1$, denoted as $$\frac{d_1}{d_1 + d_2}.$$

The point 570) defines the entry point of the sight lines (540) into the transparent pad (510).

Figure 6:
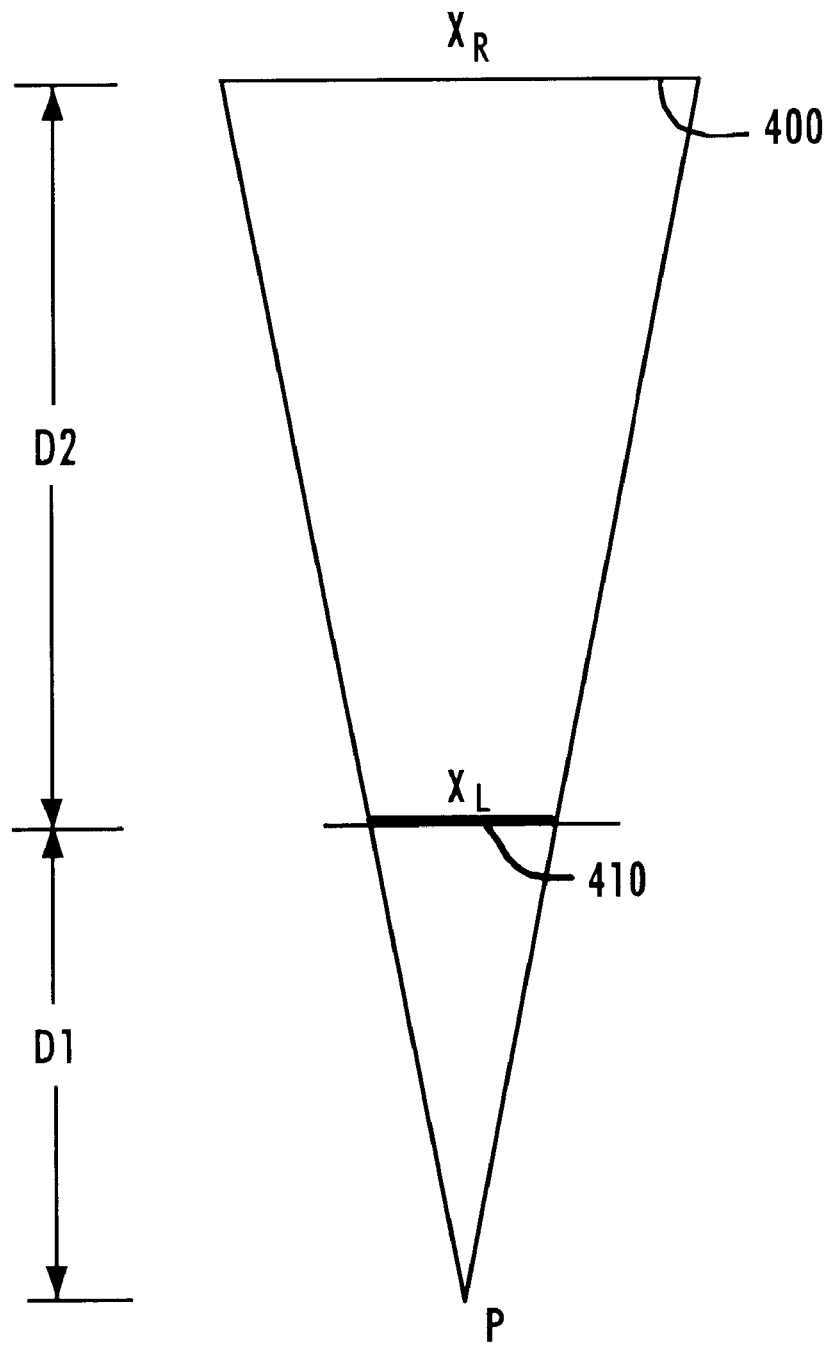
FIG. 6 illustrates geometric relationships used in scaling and locating a wireframe model.

FIG. 6 illustrates relationships between a real dimension $X_R$ and its corresponding projection, $X_L$ (410) on the display screen. A perspective point P shows the viewing point. When a three-dimensional wireframe model is downloaded, typical file formats include information about the real dimensions and the relative dimensions of the wireframe. Thus, $X_R$ represents a real dimension and $X_L$ the projected dimension on the screen. The triangle formed by base $X_L$ with respect to point P and the triangle formed by base $X_R$ with respect to point P are similar. Therefore:

$$\frac{X_L}{X_R} = \frac{d_1}{d_1 + d_2}$$

$$X_L = X_R\left(\frac{d_1}{d_1 + d_2}\right)$$

$$X_L d_1 + X_L d_2 = X_R d_1$$

$$X_L d_2 = X_R d_1 - X_L d_1$$

$$d_2 = \frac{X_R d_1 - X_L d_1}{X_L}$$

For example, if:
$X_L$=5.4"
$d_1$=18"
$X_R$=36"
then $$d_2 = \frac{648 - 97.2}{5.4} = 102''$$

The determination of $X_L$ can be obtained from (1) the display software, (2) from screen measurement or (3) from clicking on two end points of a line, calculating the length in pixels (from the addresses of the points clicked on) and converting length in pixels to (e.g.) inches using display resolution information.

Figure 7:
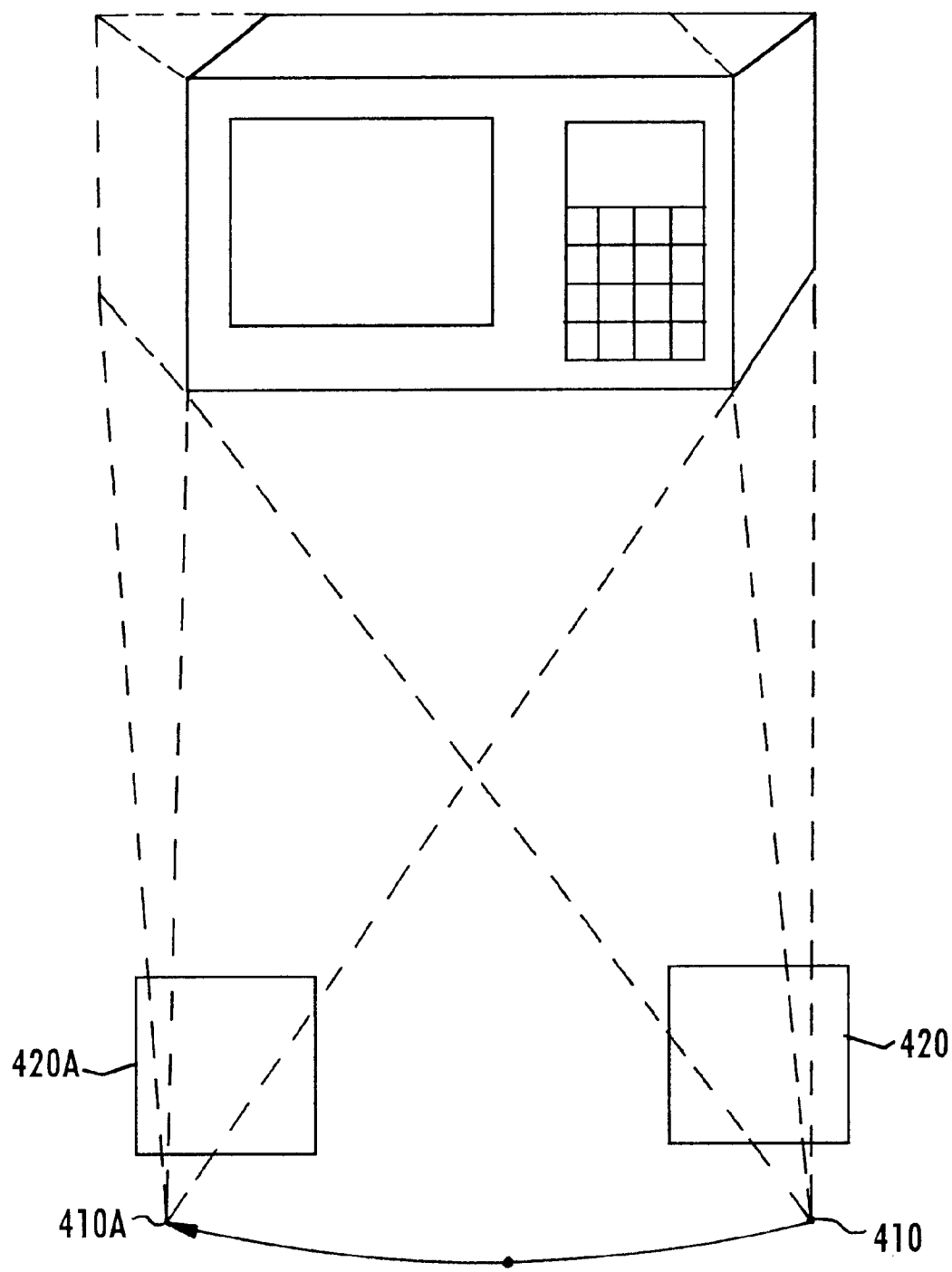
FIG. 7 illustrates how a perspective view of a fixed virtual object changes as the location of the SunPad changes.
Figure 8:
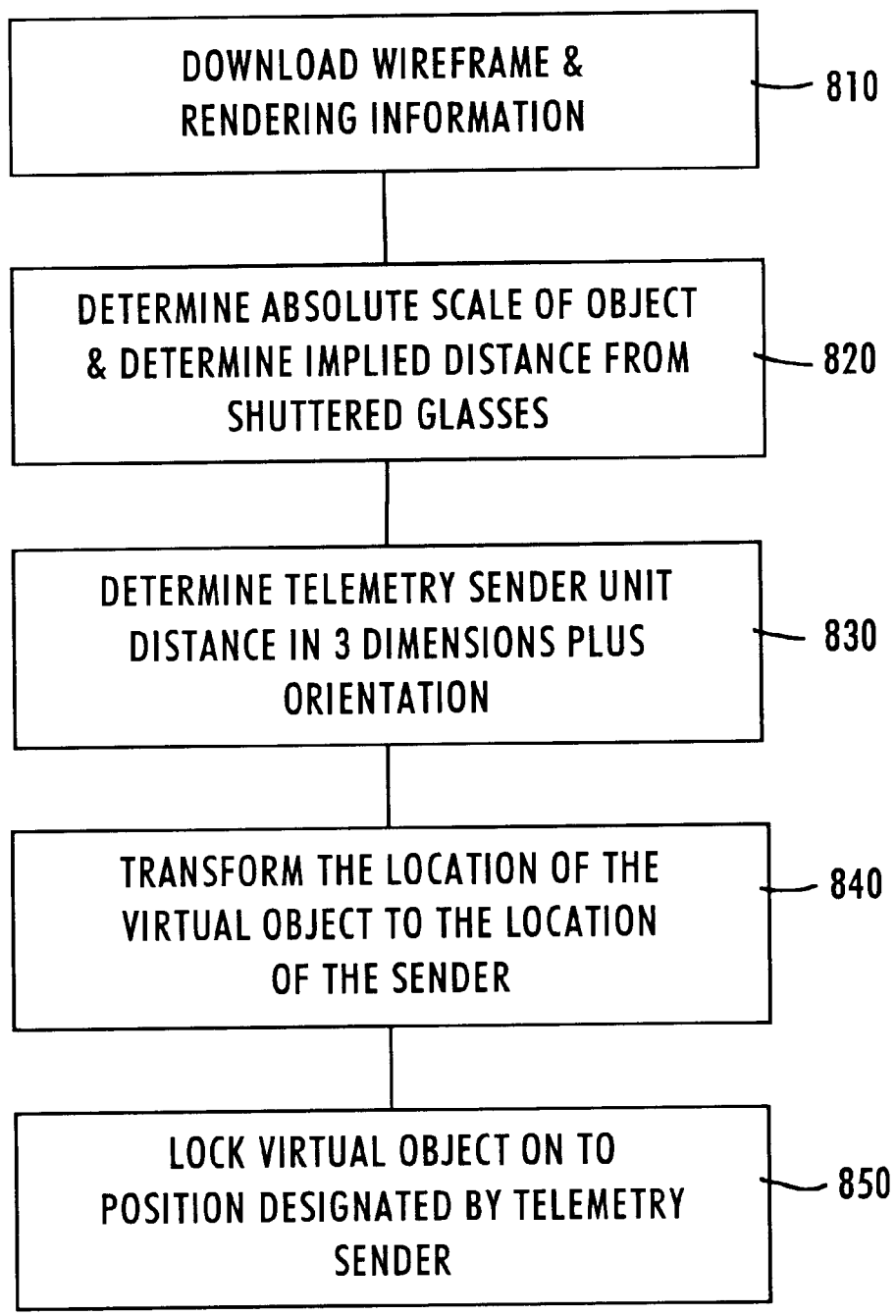
FIG. 8 is a flow chart of the computations and steps required to scale and place the virtual object at its target location.

FIG. 7 illustrates how a user's view of the virtual object will change as the transparent pad is rotated around the stationary telemetry device placed at the target destination. As the shuttered glasses (710A) and the transparent pad (720A) are moved around the object (to the left) the new view of the object (740A) is seen (indicated by the dashed lines). FIG. 8 is a flow chart of the computational activities which occur to permit imaging of the virtual object. The three-dimensional wireframe with rendering information is downloaded from a source (such as the World Wide Web) in a standard graphic file format to the transparent SunPad (810). Using the true physical dimensions of the object and the relative dimensions of the wireframe (all of which are included as metadata in the graphics file), one determines the scaling factor relative to the transparent pad and, in turn, the scaling factor (with implied distance $d_1+d_2$) from the shuttered glasses (820) as described above. The SunPad receives from the sending telemetry device located at the target destination its distance in three dimensions and orientation relative to the SunPad (830). Using the distance information from steps 820 and 830, transform the wireframe to the location of the sender 380 which will result in a new scaling factor so that the virtual object will scale correctly when imaged at the sending telemetry device, looking from the shuttered glasses through the transparent pad (840).

Figure 9:
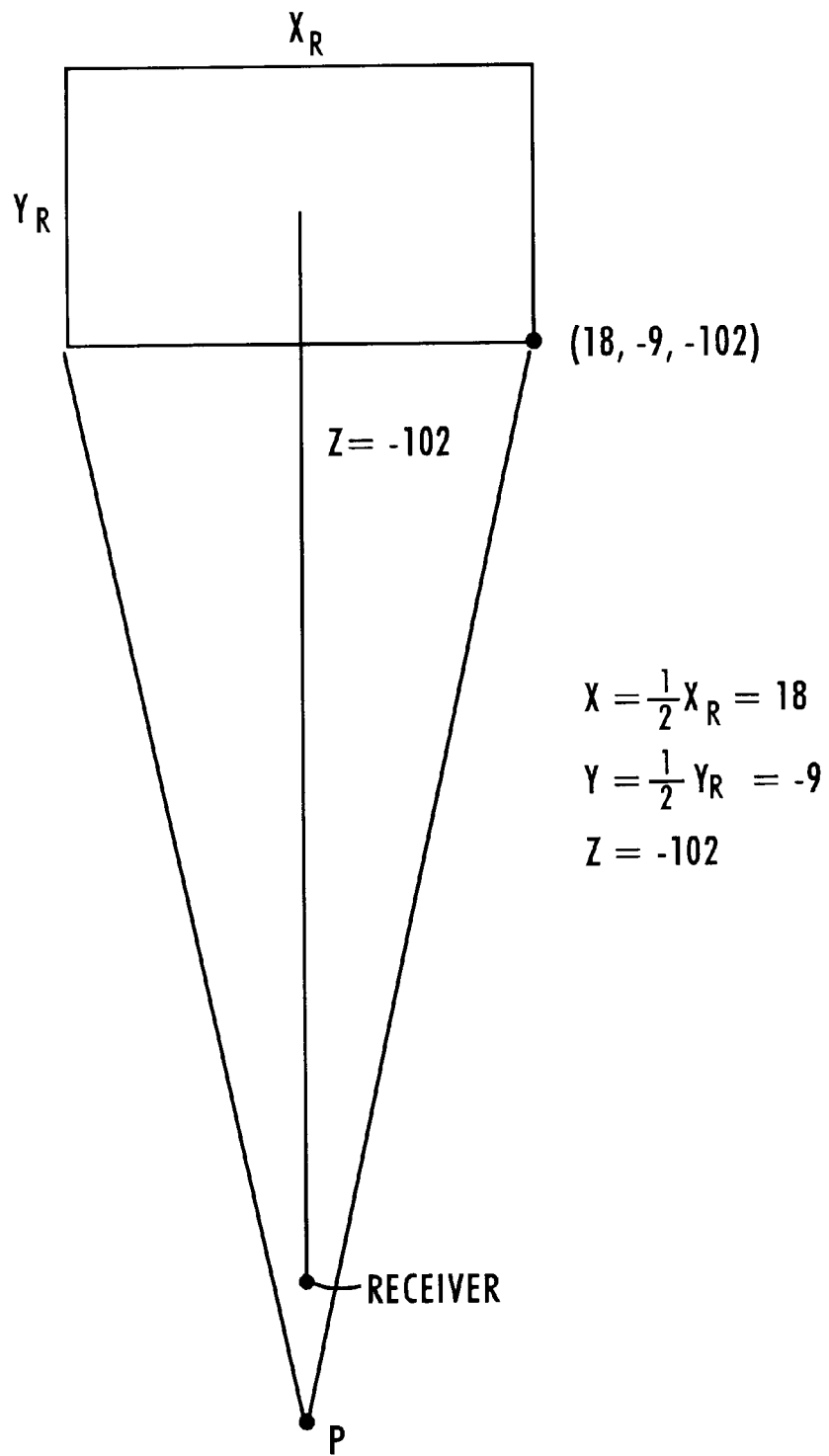
FIG. 9 illustrates locating a point on a virtual object in a coordinate system centered on the display of a computing device.
Figure 10:
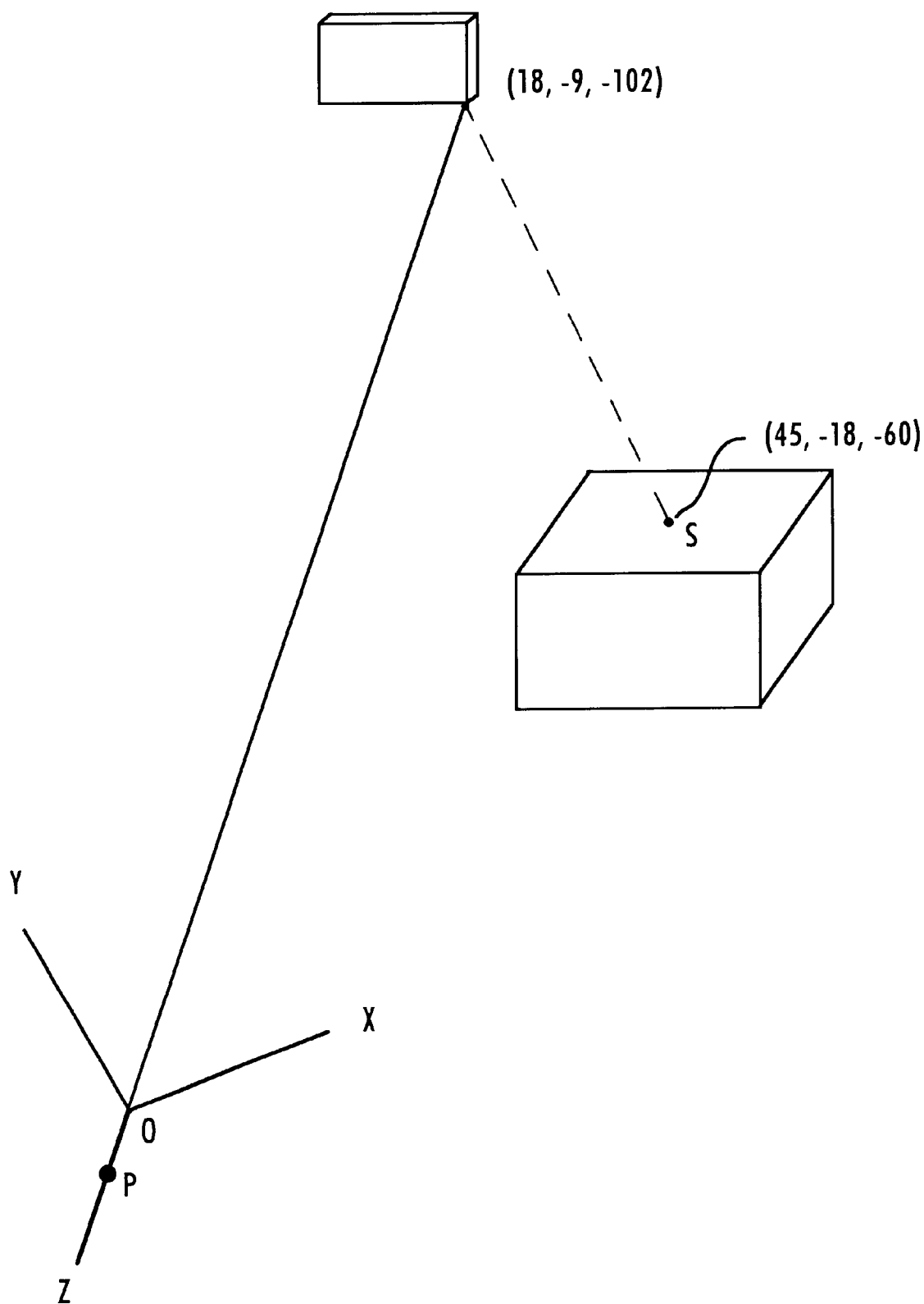
FIG. 10 illustrates positioning and locking a virtual object to a fixed point in the environment.

After being scaled, the coordinate system of the object imaged on the transparent pad must be locked (850) to the coordinate system of the target destination which has by a telemetry sender. FIGS. 9 and 10 illustrate this process.

FIG. 9 illustrates locating a point on a virtual object in a coordinate system centered on the display of a computing device. The "Z" coordinate value was determined as described in connection with FIG. 6. If the metafile representation of the wireframe is such that the object is centered in the X-Y plane on the Z axis, the X and Y coordinates of point C are at ½ $X_R$ and ½ $Y_R$ respectively (see FIG. 2). Thus, the location of point "Z" is (18, 9, 102). If the virtual object is not centered, information from the metafile specifying the location and orientation can be used to identify the coordinates of point C.

FIG. 10 illustrates a portion of the process of fixing or locking the virtual object onto a desired position in the space of the environment. A telemetry sender is located at point S which with respect to the origin of the coordinate system shown in FIG. 10 which is the receiver location on the hand held device. At the instant shown, point 5 is located at (45, −18, −60). However, the virtual object is located at (18, 9, −102) with respect to the origin 0. Standard coordinate transform techniques are utilized to relocate the point (18, 9, −102) to the point (45, −18, −60). In this case, in the X dimension, the translation from X=18 to X=45 requires a displacement of +27. Similarly, in the Y dimension, the movement from +9 to −18 requires a displacement of −27. In the Z direction, the movement from Z=102 to Z=60 requires the displacement of +42. The XYZ axes of FIG. 7 form a right hand set so that the location of the virtual object in the Z direction is actually along the −Z axis so that distance $d_2$ is a negative number.

Once the transform required to move virtual coordinate from the specified point (18, 9, −102) to (45, −18, −60) is defined, that transformation must be applied to all the other vertices of the wireframe. The display software will scale appropriately for its new location.

Once transmitted to the sender's location, the wireframe is locked into position by continually transforming the coordinates of the wireframe vertices to be appropriately positioned within the room space as the location of the hand held device continues to move as shown in FIG. 7. Thus, a transform matrix initially defines the translation from point (18, 9, −102) to point (45, −18, −60). Once that matrix is set, as it is when a device is locked, then as the origin of the coordinate system, that is, as the receiver location moves as a hand held device relocates in the room space, the telemetry receiver receives new location information from the telemetry sender S and a new transformation matrix is calculated so as to maintain the vertices of the wireframe positioned with respect to the location of the sender at point S. Effectively, point S becomes a fixed point and the transformation matrix for the vertices of the wireframe are continually adjusted to hold the virtual object at that point by changing the elements of the transformation matrix to ensure that result.

As the receiver R moves within the room, the coordinates of the target position $S_1$ change with respect to the origin of the coordinate system at the receiver R. However, the receiver always receives the current coordinates of $S_1$ with respect to the receiver as the origin of the coordinate system. Locking the corner of the microwave oven to the room or the world coordinate systems means updating the point (18, 9, 102) of the initial object of the current value of (X, Y and Z) coordinates detected at R from the sender $S_1$. As a hand held computing device is, for example, rotated, there will come a time when a microwave oven located at the corner of the table shown is not visible in the viewing screen. It can be made viewable again by either turning back toward the sender's location or by increasing the field of view by bringing the transparent display closer to the face, like peering out of a small window. Detecting changes in the distance $d_1$, using the telemetry sender in the shuttered glasses will result in changes in the perspective viewpoint used by the three-dimensional to two-dimensional mapping software used for generating the left- and right-eye views for displaying the three-dimensional object on the two-dimensional screen.

Since the receiver also detects roll, pitch and yaw information, the perspective view displayed on the screen of the three-dimensional object is always corrected for the orientation of the transparent display screen.

With a plurality of senders, a plurality of virtual objects can be virtually placed in a room, thus enabling one to virtually furnish a room when viewed through the transparent screen.

Since the fixing of one point of the three-dimensional object is insufficient to uniquely position it in three-dimensional space, rotations of the wireframe may be needed about the fixed point S (45, −18, −60), for example). Such rotations are well known in the art as part of generalized coordinate transformations. With one point fixed, rotations in two of X-Y, Y-Z, and X-Z planes about this fixed point may be required to correctly position the virtual object with respect to its environment. Typically, such rotations are accomplished under control of the up/down left/right arrow keys such as those shown at 230 in FIG. 2. A generalized coordinate transformation matrix includes angular components for specifying rotation as well as translational components. Thus, by adjusting the terms of the transformation matrix as the telemetry receiver moves about the room with the hand held device, a wireframe object may be virtually positioned and held in position for viewing from a number of perspectives around the room.

There has thus been disclosed methods, apparatus, systems and computer program products for overcoming the problems of the prior art mentioned above and which permit a ready visualization in the user's own environment of virtual objects, correctly scaled and located as they would appear in real life if they were actually in the user's environment.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. Apparatus for displaying a three dimensional representation of an object in the context of an environment in which the object might be placed, comprising:
   a computing device with a transparent display;
   a viewer for permitting a user to view images on the transparent display and through the transparent display; and
   at least one device for measuring distance between the viewer and the computing device and between the viewer and a location in the environment;
   in which the computing device is configured to display an image of said object as if the object were positioned at said location in said environment.

2. Apparatus of claim 1 in which the device for measuring distance includes at least one telemetry sender and at least one telemetry receiver.

3. Apparatus of claim 1 in which the telemetry sender is removably attached to said computing device.

4. Apparatus of claim 1 in which the computing device is configured to fix said three dimensional representation at said location.

5. Apparatus of claim 1 in which the computing device is configured to change the orientation of said three dimensional representation at said location under user control.

6. Apparatus of claim 1 in which said image of said object is a stereo image.

7. Apparatus of claim 1 in which said viewer is a stereo viewer.

8. A method for displaying a three dimensional representation of an object, comprising the steps of:
   a. providing an element for performing the step of displaying said three dimensional representation of said object;
   b. providing at least one hardware element for performing the step of determining a distance from a display of a computing device to a location at which said object should appear to be located; and
   c. providing an element for performing the step of adjusting the display of said three dimensional representation to appear to be positioned at said location.

9. The method of claim 8 in which said object is displayed on a transparent display screen by which the context of an environment in which the object might be placed can be concurrently viewed.

10. The method of claim 9 in which the object is displayed in stereo.

11. The method of claim 8 further comprising:
    providing an element for performing the step of downloading said three dimensional representation to a computing device from another computer.

12. The method of claim 9 in which the downloading occurs over a network.

13. A system for displaying a three dimensional representation of an object in the context of an environment in which the object might be placed, comprising:
    a source of one or more three dimensional representations of respective objects;
    at least one hardware element for identifying a fixed position in said environment;
    a computing device for displaying on a transparent display a three dimensional representation of an object oriented and scaled so as to appear to be located at said fixed position, and
    a selectively actuatable link between said source and said computing device for downloading three dimensional representations to said computing device.

14. The system of claim 13 in which said selectively actuatable link between said source and said computing device is a network link.

15. The system of claim 13, in which said network link is a dial up link.

16. A method for accessing information about items available for acquisition, comprising the steps of:
    providing an element for performing the step of retrieving at least one three dimensional representation of one of said items; and
    providing an element for performing the step of displaying said at least one three dimensional representation on a transparent screen, said three dimensional representation being oriented and scaled to appear to be located at a location determined by at least one hardware element in an environment visible through said transparent screen;

whereby said three dimensional representation can be viewed in context of said environment.

17. A system for accessing information about items available for acquisition, comprising:

a network;

a first storage device containing at least one three dimensional representation of one of said items connected to said network;

a computing device connected to said network, configured to download and display three dimensional representations;

a stereo viewer connected to said computing device; and at least one device for measuring distance between the stereo viewer and the computing device and between the stereo viewer and a location in the environment of said computing device;

said computing device displaying three dimensional representations at said location with a scale determined by the distance between the stereo viewer and the computing device and between the stereo viewer and said location in the environment.

18. A computer program product comprising:

a memory medium; and a computer program stored on said memory medium containing instructions for displaying on a transparent display a three dimensional representation of an object with sizing and orientation appropriate to a location in an environment that is visible through said transparent display which location is specified by information received from at least one hardware element.

19. The computer program product of claim 18 in which said instructions for displaying a three dimensional representation cause displaying of stereo views of said representation.

* * * * *